July 10, 1956 W. M. MURFIN 2,753,899
ANNULAR POWER SAW

Filed Nov 19, 1951 7 Sheets-Sheet 1

WILLIAM M. MURFIN
*INVENTOR.*

BY *Browning & Simms*

July 10, 1956 W. M. MURFIN 2,753,899
ANNULAR POWER SAW
Filed Nov 19, 1951 7 Sheets-Sheet 2

WILLIAM M. MURFIN
INVENTOR.

BY Browning & Simmd

WILLIAM M. MURFIN
INVENTOR.

July 10, 1956 W. M. MURFIN 2,753,899
ANNULAR POWER SAW

Filed Nov 19, 1951 7 Sheets-Sheet 4

WILLIAM M. MURFIN
*INVENTOR.*

BY

July 10, 1956 W. M. MURFIN 2,753,899
ANNULAR POWER SAW

Filed Nov 19, 1951 7 Sheets-Sheet 5

WILLIAM M. MURFIN
*INVENTOR.*

BY

WILLIAM M. MURFIN
*INVENTOR.*

United States Patent Office 2,753,899
Patented July 10, 1956

2,753,899

ANNULAR POWER SAW

William M. Murfin, Houston, Tex.

Application November 19, 1951, Serial No. 257,032

16 Claims. (Cl. 143—85)

This invention relates to a sawing apparatus. In one of its aspects it relates to an apparatus particularly adapted to saw a material to fit around pipe or other conduit of circular cross-section. In another of its aspects, it relates to apparatus for feeding and guiding a block of material into a saw.

In the manufacture of insulating material for the covering of pipes, conduits and the like, it is conventional to form such covering in the shape of an annulus to fit closely around the pipe. It is preferred for various reasons to form the insulating material in long pieces of semi-annular cross-section so that the insulation can be easily applied to pipe in the field by merely placing two semi-annular pieces around the pipe and then fastening in place. Molding processes can be employed in some instances to fabricate pipe insulation but some materials, such as polymerized styrene which has been expanded into a solid foam-like structure, cannot feasibly be molded and some means must be provided for cutting blocks of the same into the desired shape. While certain other materials may be moldable into the desired shape, such molding is expensive. Sawing of insulating materials to the desired shape has been found to be a very satisfactory and much more economical means for shaping insulating materials than is molding. While it has been suggested that straight sections of pipe covering could be sawed from blocks of insulating material, a machine has not as yet been developed which can successfully saw the material to fit around elbows, pipe bends and the like. To perform such an operation, the saw must not only cut the material to have a semi-annular cross-section but also to give a final product which is curved to fit around the elbow, pipe bend or the like.

It is an object of this invention to provide a sawing apparatus which not only can cut insulating or other sawable material into straight lengths having a semi-annular cross-section, but also can saw blocks of such material into semi-annular cross-sectional shapes which curve about an axis so as to be adapted to fit around pipe elbows, pipe bends and the like.

Another object of this invention is to provide a sawing apparatus for making a semi-circular cut into a solid material, the cut curving about an axis laterally removed from the cut.

Another object of this invention is to provide a sawing apparatus for making a plurality of semi-circular cuts through a block of material so that a plurality of lengths of material each having a semi-annular cross-section can be formed in a single cutting operation.

Another object of this invention is to provide a power saw wherein an annular saw blade is supported by a plurality of rollers situated about 180° or less of the circumference of said blade and bearing thereagainst within an external groove in the blade whereby a portion of the periphery thereof is left free from supporting members.

Another object of this invention is to provide a rotatable annular saw blade having a circumferential groove therein, the groove being adapted to receive a plurality of rollers disposed along a portion of the circumference of the saw blade for supporting the same and to also receive a belt or other driving means which assists in maintaining the saw blade in operative position on the rollers.

Another object of this invention is to provide a rotatable annular saw blade having substantially one-half of its circumference unobstructed by any supporting means, the supporting means being arranged at the other one-half of the blade's circumference and comprising a plurality of rollers bearing radially against the saw blade by running in a circumferential groove therein, the rollers and the groove further being constructed to oppose any substantial movement of the saw blade in the direction of its rotational axis.

Another object of this invention is to provide a rotatable annular saw blade which is supported by a plurality of rollers disposed along both the inner and outer circumference of the blade and about an arc of 180° or less whereby a substantial portion of the saw blade is free for making an arcuate cut into a material, the outer rollers cooperating with the sides of a circumferential groove in the blade to oppose lateral or longitudinal movement of the blade.

Another object of this invention is to provide an apparatus wherein an annular saw blade having the general configuration of a hollow cylinder of relatively short length and with cutting teeth on one lateral edge thereof, is supported by a plurality of rollers cooperating with a circumferential groove in the blade, the rollers being distributed about a minor portion of the circumference of the blade whereby material can be moved through the unsupported portion of the blade to form sections having semi-circular or other arcuate contours and can be turned through the blade about an axis laterally displaced from and parallel to the plane of rotation of the blade.

Another object of this invention is to provide in such a sawing apparatus a feeding and guiding means adapted to turn a piece of material through an annular saw blade about an axis lateral of and parallel to the plane of the saw blade.

Another object of this invention is to provide such a guiding and feeding means wherein dogs are provided for engaging a block of material having a semi-circular contour to guide the block through a saw to make another semi-circular cut to yield a product having a semi-annular cross-section.

Another object of this invention is to provide a sawing apparatus comprising a plurality of rotatable annular saw blades supported in accordance with this invention, the blades being disposed coaxially with but removed from each other so that a plurality of cuts can be made in a block of material, and guide means between adjacent blades for guiding the material through the plurality of saw blades.

Other objects, advantages and features of this invention will be apparent to one skilled in the art upon a consideration of the written specification, the appended claims and the attached drawings wherein:

Figure 1:
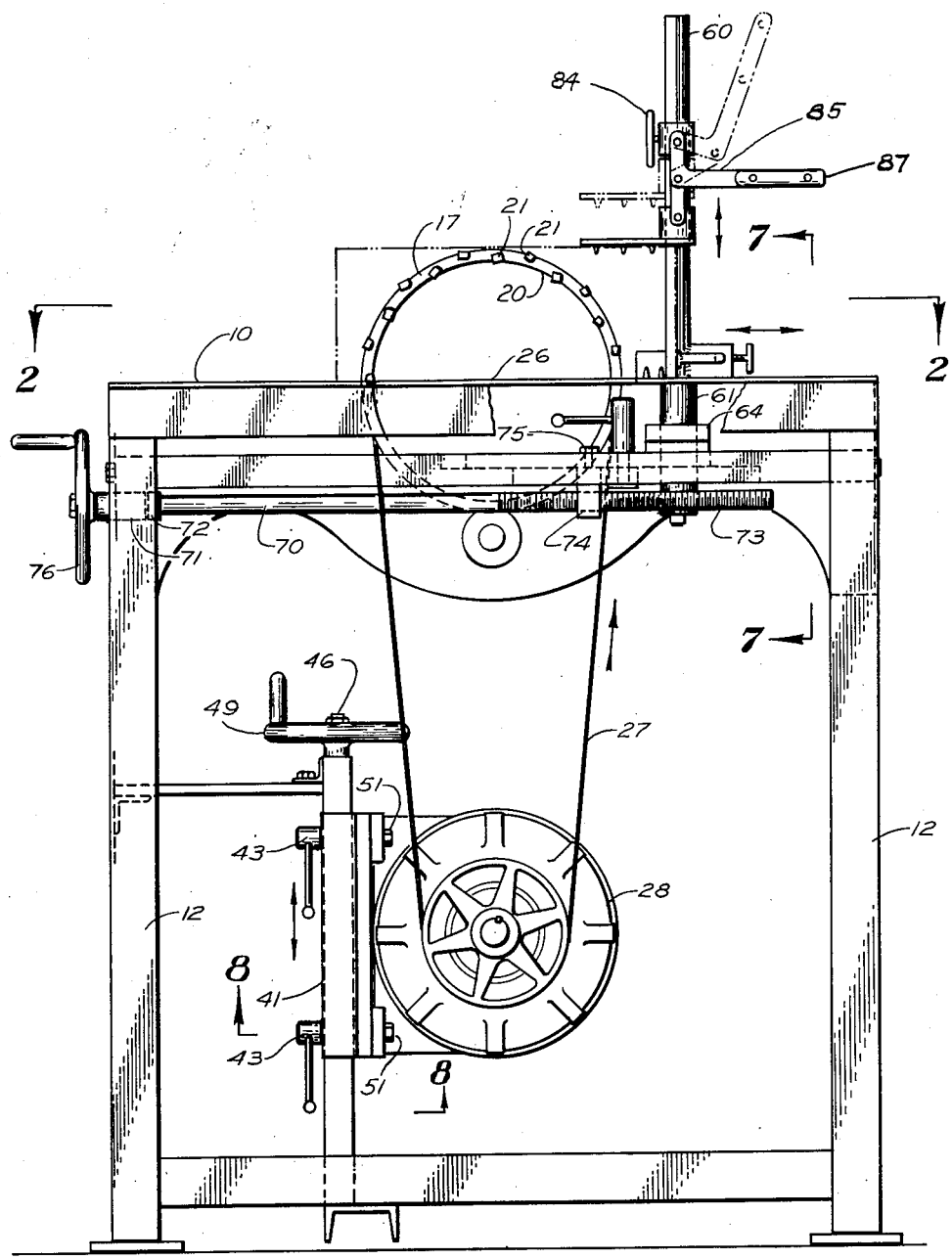
Fig. 1 is a general elevational view partially in section, of a preferred embodiment of the apparatus of this invention.

Referring now to the drawings, there is provided a table-like frame designated generally by the numeral 10 and having a table top 11 supported on legs 12. Top 11 has an opening 13 therein adjacent to which is a frame or frame member 14 formed from a plate and supported under the table top by having its ends attached to frame members 15.

In a preferred embodiment of this invention, an annular saw blade 16 is disposed to have approximately one-half of its circumference lying above the plane of table top 11 and to have its cutting edge or teeth disposed along a circumferential edge of the blade so that a block of material can be pushed or pulled along table top 11 through the saw blade. As shown in the drawings, the saw blade comprises a metallic annular body 17 with a groove 18 disposed in its outer circumferential face and with its inner circumferential face 20 being substantially flat, as viewed in cross-section as in Fig. 6. This saw blade has cutting teeth 21 disposed in a lateral edge thereof and, in a preferred embodiment, the teeth are formed from carbide tips soldered in pockets in the edge of the annular blade, alternate teeth being disposed to have portions extending outwardly of the outer circumference and inwardly of the inner circumference, respectively, of the annular saw blade so as to provide the proper set for the blade to prevent binding of the same when cutting material. It will thus be seen that the annular saw blade can be said to be in the form of a relatively short cylinder having a longitudinal axis about which it is adapted to be rotated and further having teeth disposed on one end edge to provide a cutting edge rotatable in a plane perpendicular to the longitudinal axis of the blade so as to be adapted to cut material passing into the blade in a direction towards the cutting edge thereof. It will also be noted that the width $w$ of the blade is relatively small compared to the diameter thereof, the latter dimension being dependent upon the inner or outer radius of the annulus of the final product. In many instances the width of the saw blade will be substantially less than one inch whereas the diameter may vary from four inches to as much as twenty-four inches or more.

Figure 6:
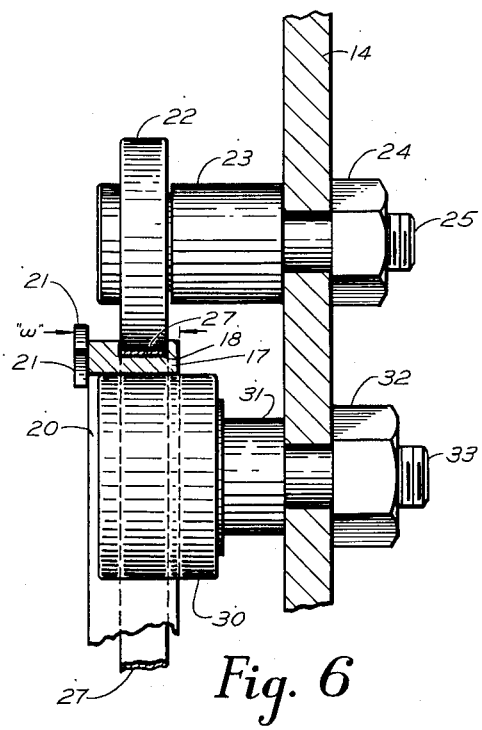
Fig. 6 is a view taken on the line 6—6 of Fig. 3.

To support saw blade 16 with a portion of its periphery, usually one-half thereof, above the plane of table top 11, there are provided a plurality of rollers 22 carried by frame member 14 and arranged about an arc of less than 180° below the table top so that the rollers bear against the saw blade by rolling within groove 18, as illustrated in Fig. 6.

It will thus be seen that the portions of the faces of rollers 22 which bear against the saw blade are disposed about an arc having the same radius as that of the innermost face of groove 18.

Each of rollers 22 is rotatably carried by a stub shaft 23 and can be connected thereto by means of a suitable antifriction device such as roller bearings or the like. Stub shafts 23 can be bolted to frame member 14 by means of nut 24 threaded to a reduced diameter portion 25 of the stub shaft.

The width of rollers 22 should be such that the sides of the rollers have a free running fit with the sides of groove 18 so that they are free to rotate or to be driven by the saw blade without undue rubbing of the sides of groove 18 along the sides of the roller. The width of groove 18 can be made somewhat greater than to provide such a free running fit but should such width become excessive, then the saw blade will tend to oscillate in and out of the plane in which it should rotate. If groove 18 is made too narrow so as to have a binding fit with the sides of roller 22, not only will there be excessive friction, but also the saw blade will tend to ride up so that groove 18 tends to become disengaged from the rollers. With respect to this matching of rollers 22 with groove 18, it should be noted that all of rollers 22 should be arranged to be in a single plane, such plane being coincident with the plane of groove 18.

Figure 3:
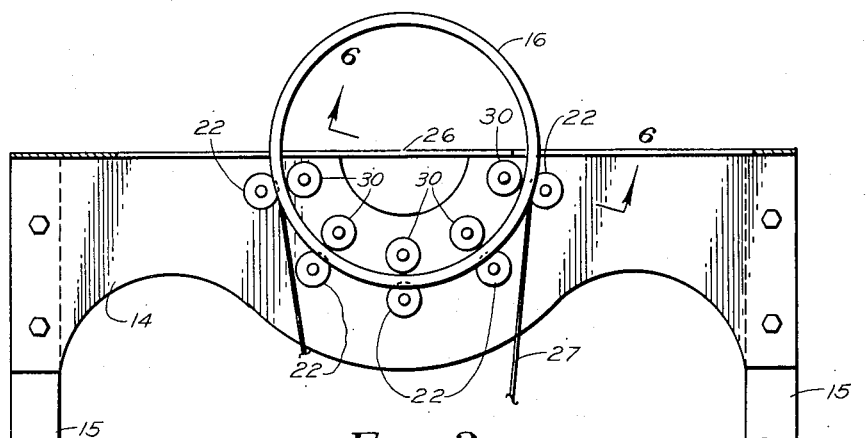
Fig. 3 is a view taken on the line 3—3 of Fig. 2.

With rollers 22 arranged as illustrated in Fig. 3, it will be apparent that saw blade 16 can be positioned thereon with the rollers bearing against the blade within groove 18 and that the blade can be rotated about its axis 26. Should a force be applied to one lateral edge of the blade, the rollers will bear against the sides of the groove in the blade to resist this force and thereby maintain the blade in its proper position. Thus the rollers not only contact the bottom of the groove to support the blade vertically but also can bear against the sides of the groove to counteract thrust from the material being sawed and thus to support the blade against lateral movement. It is apparent from the foregoing that the groove in the blade and the rollers running therein must have surfaces in contact which not only permit the rollers to resist vertical movement of the blade but also to resist lateral movement of the blade out of its plane of rotation. In other words, the groove is shaped so that its side portions extend respectively along the sides of a particular roller to a point beyond the outermost periphery of the roller and toward the axis of rotation thereof.

To furnish a means for rotating blade 16 and for maintaining it in contact with rollers 22 and hence supported thereby, there is provided a belt 27 adapted to be driven by a motive means such as electric motor 28 and to pass over that portion of the periphery of saw blade 16 which is opposite to rollers 22 to thereby pull blade 16 in close contact with these rollers and augment their supporting function. Belt 27 is situated so as to lie in the same plane as blade 16 and rollers 22 and to exert a coplanar pull on the saw blade toward rollers 22. Belt 27 is preferably made of such width that it can freely run in groove 18 of the blade and of such thickness that it occupies only a small fraction of depth of groove 18 so that it can pass between the blade and the two rollers which are closest to table top 11, one on each side of the blade, as illustrated in Fig. 6. By so arranging these two uppermost rollers and the belt, there will be provided a positive guiding means for insuring that the belt will always run within the groove.

A plurality of idler rollers 30 can be carried by frame member 14 to bear against the inner circumference of blade 16 and to hold the same in such position that rollers 22 engage the blade from within groove 18. Rollers 30 are of sufficient number and so arranged that the saw blade is confined between opposing sets of rollers. Rollers 30 can be of considerable width to bear against a substantial portion of the width of the blade 16 and need not, if desired, be in continual contact with the blade but can be arranged to be spaced therefrom a short distance, such distance being insufficient to permit the blade to ride up and free a roller 22 from groove 18. Thus, idler rollers 30 can serve to augment the function of belt 27 in maintaining the saw blade in contact with rollers 20. In addition, these idler rollers will prevent the blade from flying out of its proper place should belt 27 break and thus are in this sense safety devices for the protection of workmen.

Rollers 30, like rollers 22, are supported by stub shafts 31 bolted to frame 14 by nuts 32 carried on reduced diameter portions 33. Rollers 30 can also have antifriction means such as roller bearings connecting them with their stub shafts.

It will be seen from the foregoing that when saw blade 16, rollers 22 and belt 27 are arranged in the manner shown in Fig. 1, motor 28 can be started to turn saw blade 16 about axis 26. The material to be sawed can be pushed over table top 11 until it contacts the cutting teeth 21 of the saw blade which will saw a kerf in the material sufficently wide to accommodate the thickness of the saw blade and to permit the material to pass freely therebeyond. Since no supporting means are provided adjacent the portion of the periphery of the blade which does the cutting, it will be evident that the required width of the kerf is governed by the thickness of the saw blade and that teeth 21 can be set to provide passage for this thickness. The width of the kerf will, of course, be dependent for its minimum upon the manner in which the saw is to be used. When sawing a block of material to fit over a short radius pipe elbow, for example, the kerf must be sufficiently wide that when the block is turned through the saw blade about an axis lateral thereof, as will be explained more fully hereinafter, the width of the kerf will permit the block of material to clear the edge of the blade most remote from the teeth.

Figure 8:
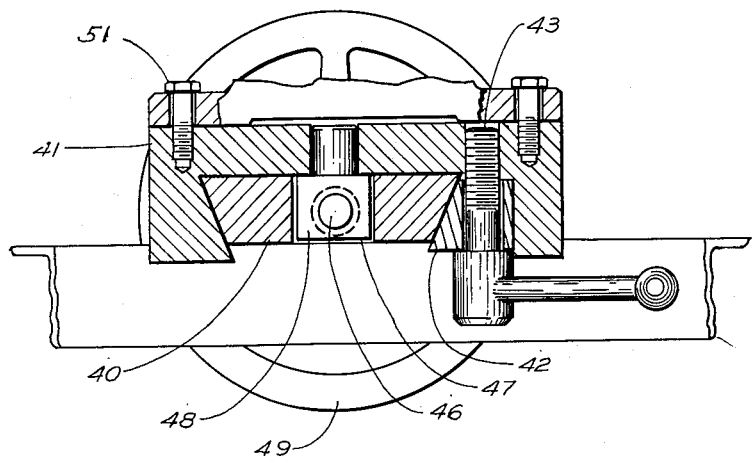
Fig. 8 is a view taken on the line 8—8 of Fig. 1.

It may at times be necessary to change the diameter of the saw blade in order to make cuts of different radius. This means, of course, that rollers 22 and 30, if the latter are used, must be rearranged to conform with the new diameter of the new saw blade. While there are several methods for doing this, one of the most advantageous is to provide a plurality of support members 14 with rollers 22 and 30 permanently mounted thereon for a particular diameter of saw blade 16 to be used. Then when it is desired to change the radius of cut, it is merely necessary to unbolt support member 14 and remove the entire member as well as the saw blade and supporting rollers from the table. Another support member bearing the desired diameter of saw blade can then be bolted in position. Rollers 30 function to maintain the saw blades in position when the belt is removed. This permits rapid interchange of the saw blades without the necessity for exactly realigning rollers 22 and 30 each time a diameter of saw blade is changed. However, with blades of different diameters, it will be necessary to move motor 28 with respect to the blade in order to keep belt 27 tight and means are provided for shifting motor 28 towards and away from table top 11. Such means can comprise a support member 40 (Fig. 8) having two sides beveled toward each other to slidably receive thereon a motor mount member 41. The latter member has a recess which is beveled at one side to correspond to the bevel on one side of member 40. A clamping member 42 is provided at the other side of member 41 and has a beveled portion corresponding to the other beveled edge of member 40. The clamping member is attached to member 41 by means of take-up studs 43 extending through member 42 and threaded to member 41 so that member 42 can be drawn tightly against the beveled edge of member 41 to lock the motor mount member 41 in any selected position along the length of member 40. A threaded shaft 46 is journaled to member 40 and extends into an elongate opening 47 therein for engagement with a threaded stud 48 carried by member 41. A suitable handle or wheel 49 is connected to the outer end of shaft 46 for rotation of the same. Upon rotation of this shaft, it will be apparent that member 41 is moved along member 40 by the threaded engagement between the shaft and stud 48 to thereby adjust the position of motor 28 relative to the table top. The motor, it will be understood, is bolted to member 41 by means of studs 51.

Figure 2:
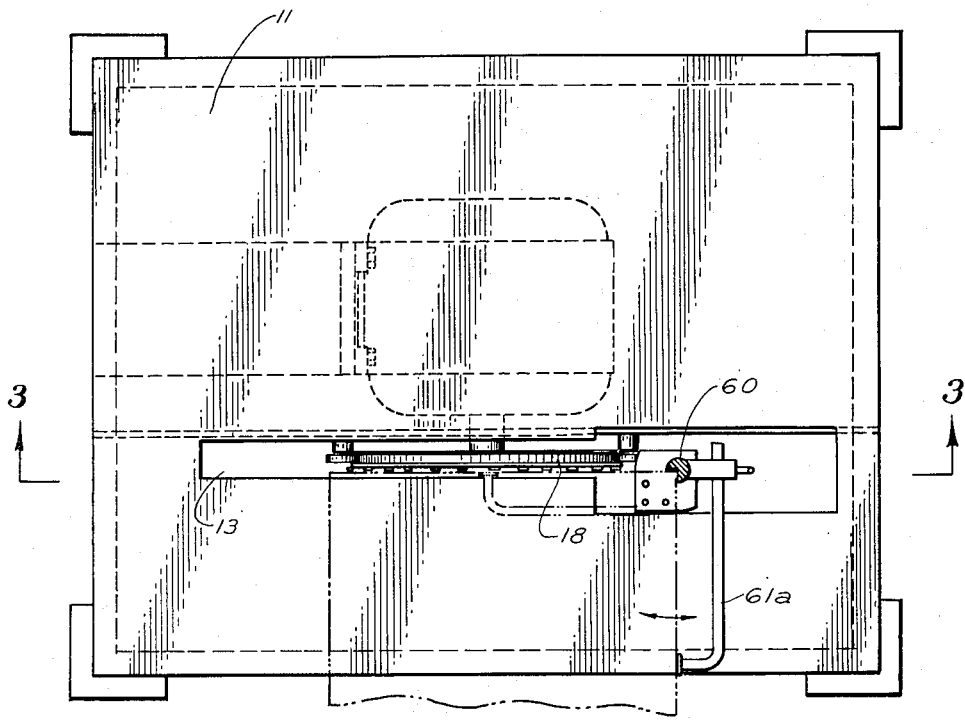
Fig. 2 is a view taken on the line 2—2 of Fig. 1.
Figure 7:
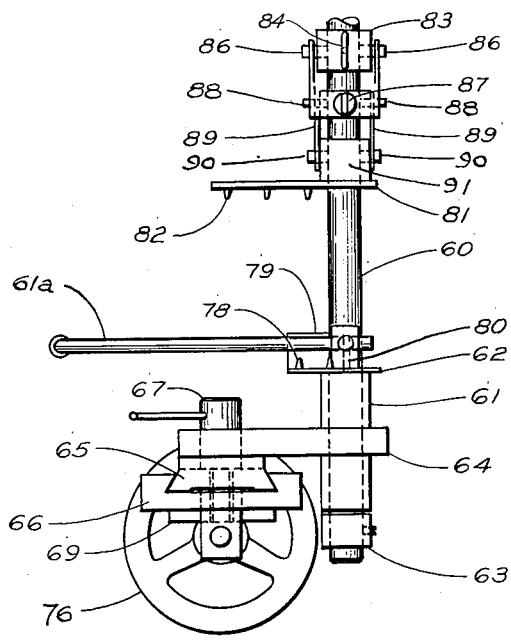
Fig. 7 is a view taken on the line 7—7 of Fig. 1.

It will be apparent that with the provision of a suitable guide if desired, a block of material can be pushed through saw blade 16 to make a straight cut having a semi-circular cross-sectional contour. In accordance with one feature of this invention, guiding and feeding means are provided for turning a block of material through the saw blade about an axis lateral to the blade and parallel to the plane thereof. As shown in Figs. 1 and 2, such means can comprise a shaft 60 arranged to one side of the saw blade and extending in a direction parallel to the cutting edge of the blade. Shaft 60 is journaled for rotation in a collar 61 and is retained in such collar by a lower dog 62 (Fig. 7) connected to the shaft and a lock nut 63. Extending laterally of the collar is a support member 64 carried by an elongate slidable member 65. Member 65 is received in a support 66 which has a groove therein with inwardly sloping sides adapted to bear against correspondingly sloping sides of member 65 so that the latter is retained within the groove and yet adapted to slide lengthwise therein. Detent means for locking member 65 to prevent sliding movement after it has been positioned, is provided in a form of a clamping stud 67 which engages a T-shaped nut 69 to thereby draw member 65 tightly against member 66 and to lock it in position. A shaft 70 can be journaled into the frame 12 by means of a collar 71 and held in place against longitudinal movement with respect to the frame by collar 72 and wheel 76. The other end of shaft 70 is threaded as at 73 to receive a nut 74 which is attached by bolt 75 to member 65. Hence, upon turning of shaft 70, member 65 will be moved with respect to member 66 by the threaded engagement of nut 74 with shaft 70. In this manner the spacing between shaft 60 and saw blade 16 can be adjusted.

As explained above, a lower dog 62 is provided on shaft 60. This dog has a plurality of teeth 78 thereon and has back-up plates 79 and 80 arranged vertically with respect to dog 62 to provide a stop for a block of material positioned thereon. Disposed above dog 62 is an upper dog 81 similarly having teeth 82. This upper dog is slidably arranged about shaft 60 by a mechanism carried by the shaft and adapted to press dog 81 toward dog 62 and to lock the same in a presseddown position. This pressing and locking apparatus can comprise a collar 83 carried on shaft 60 and having set screw 84 for adjusting it at various positions therealong. Connected to opposite sides of collar 83 is a bell crank lever 85 having one arm pivoted to collar 83 by means of pins 86 and having its other arm extended to form a handle 87. The central pivot point 88 of the bell crank lever is connected by means of links 89 and pivot pins 90 to a collar 91 carrying dog 81 and slidable upon shaft 60. Thus, means are provided whereby a block of material can be positioned on top of teeth 78 of dog 62 with handle 87 raised to an upright position, so that upper dog 81 is raised out of the way. Then upon pressing handle 87 downwardly, collar 83 will remain in fixed position while upper dog 81 is pushed downwardly to engage the block and when links 89 and bell crank 85 have been positioned to align pivot pins 86, 88 and 90, the upper dog will be locked in position. Then it will be possible to grasp handle 87 and rotate shaft 60 and the dogs arranged thereon about the longitudinal axis of the shaft so as to rotate the block grasped between the dogs into and through saw blade 16. Such rotation permits the block to not only be cut to have a cross-sectional semi-circular shape, but also to have such cut made on a radius about the longitudinal axis of shaft 60. It will be noted that a quadrant 60a of shaft 60 has been removed in order to permit a corner of the block of material to fit thereinto, thereby providing an accurate indexing point for measuring the radius of the cut and a keyway for axially positioning collar 91. Also, an arm 61a can be adjustably connected to shaft 60 for assisting in pushing a block of material through the saw blade.

Figure 4:
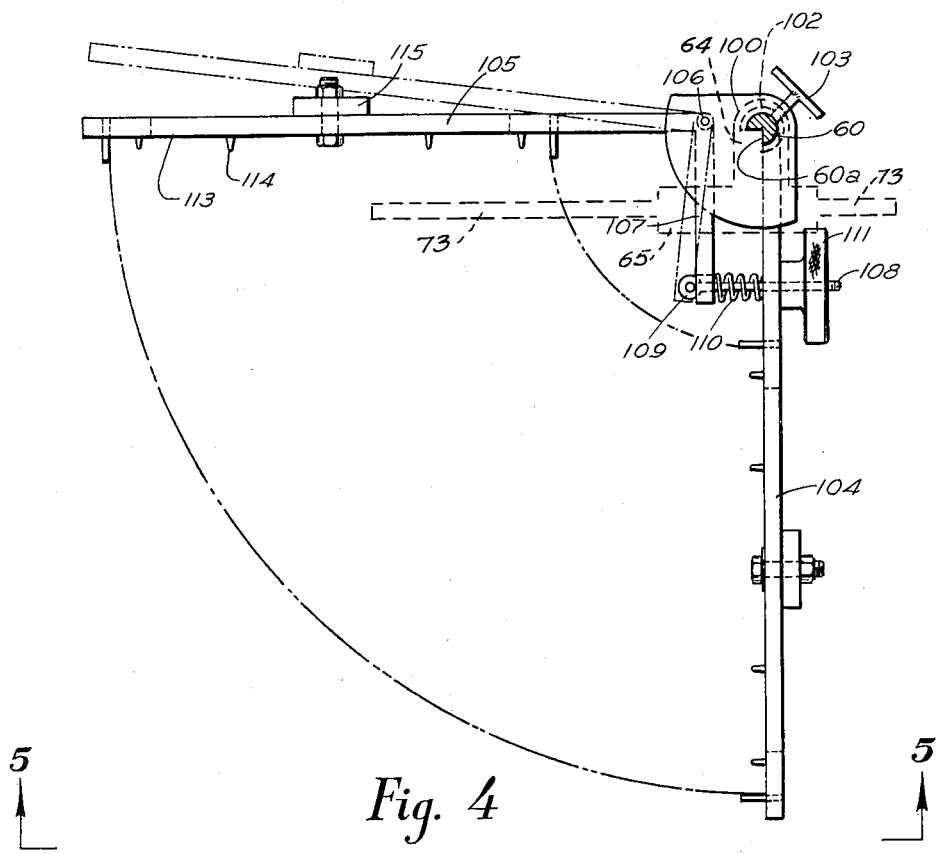
Fig. 4 illustrates one embodiment of feeding and guiding means adapted to be used with the sawing apparatus of this invention.
Figure 5:
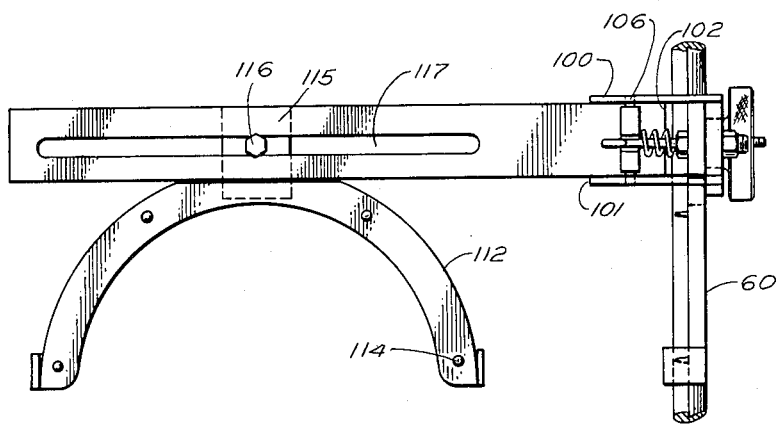
Fig. 5 is a view taken on the line 5—5 of Fig. 4.

Referring to Figs. 4 and 5, there is shown a feeding and guiding means which is not only adapted to grasp a block of material for turning it through the saw blade about an axis lateral thereof as described with reference to the means of Fig. 1, but also to grasp the ends of a sawed piece of material which has already had one surface thereof formed in an arc and in which it is desired to cut another arcuate surface to form a semi-annular shell. This means includes a pair of spaced apart support plates 100 and 101 joined together by a collar 102. This collar bears a set screw 103 and is adapted to fit over and slide along shaft 60 as shown in Fig. 1 after the upper dog 81 and attendant parts have been removed. Carried between plates 100 and 101 are a pair of elongate support members 104 and 105. Support member 104 can be fixedly attached between the plates while support member 105 is pivoted with respect thereto by means of pin 106 so as to be angularly movable about said pin and toward and away from support member 104. An annular extension 107 of member 105 has at its free end a spacing means adapted to pivot member 105 about member 106 and, hence, adjust its angular position with respect to member 104. Such adjusting means can comprise a bolt 108 pivotally attached by head 109 to the free end of extension 107. Spring 110 is provided to bias extension 107 and member 105 from member 104. An adjusting nut 111 is attached to bolt 108 on the side of member 104 opposite from member 107. By turning nut 111, the spacing of member 107 and hence of member 105 from member 104 can be readily adjusted.

Depending from members 104 and 105 are semicircular dogs 112 and 113 which have teeth 114 arranged on their faces for grasping a block of material. These dogs can be attached to their respective members by a cleat 115 and bolt 116, the latter being slidable in slot 117 in the members. In this manner, the distance between the dogs and shaft 60 can be adjusted.

In operation, the apparatus shown in Figs. 4 and 5 is placed over shaft 60 in Fig. 1, after the upper dog shown thereon has been removed. The height of the apparatus above table top 11 and the position of dogs 112 and 113 with respect to saw blade 16 is adjusted so that upon rotation of the apparatus, the saw blade will be passed within the inner circumference of the dogs. A block of material, say for example one which has had an outer radius sawed thereon, is positioned between dogs 112 and 113 with member 105 extended as shown in dashed outline in Fig. 4. Then upon tightening nut 111, member 105 will be brought towards the piece to sink teeth 114 therein. After this has been done, the entire feeding and guiding means can be rotated about the axis of shaft 60 to guide the partially sawed piece of material through the saw blade to make a semi-circular cut and thereby form a semi-annular piece of material adapted to fit over a pipe elbow, pipe bend or the like.

It will be apparent from the foregoing that a large block of material which is to be sawed into insulation covering, say for a pipe elbow, can be grasped between the upper and lower dog shown in Fig. 1 and turned through a saw blade of such diameter as to saw the piece of material to have the desired external radius about its longitudinal axis. Then the upper dog of Fig. 1 can be replaced by the feeding and guiding means of Figs. 4 and 5 and the partially sawed material grasped between dogs 112 and 113 and turned through a saw blade of smaller diameter to form the inside radius of the pipe covering. The inner material removed by this last cut can be in turn grasped between dogs of smaller size than those shown in Figs. 4 and 5 and turned through a saw blade of still smaller diameter to form another piece of insulation material adapted to fit over a smaller diameter pipe. Alternatively, this procedure can be reversed in that the smallest radius can be sawed in the block first by using the feeding and guiding means of Fig. 1. Then the saw blade can be changed to a larger size and by using these same guiding means, the block can be passed through the larger saw blade to cut a piece of insulation material. After the blade has been again changed to an even larger size, the remainder of the block can be passed with the apparatus of Fig. 1 to form a still larger radius pipe covering. This procedure can be completed until the block is consumed. In this manner the feeding and guiding means of Fig. 1 can be used without interchanging with the dogs of Figs. 4 and 5. Similarly, the dogs of Figs. 4 and 5 can be used in the just described manner by merely changing the dogs 112 and 113 to a larger and larger radius as the larger pipe covering sizes are cut.

Figure 9:
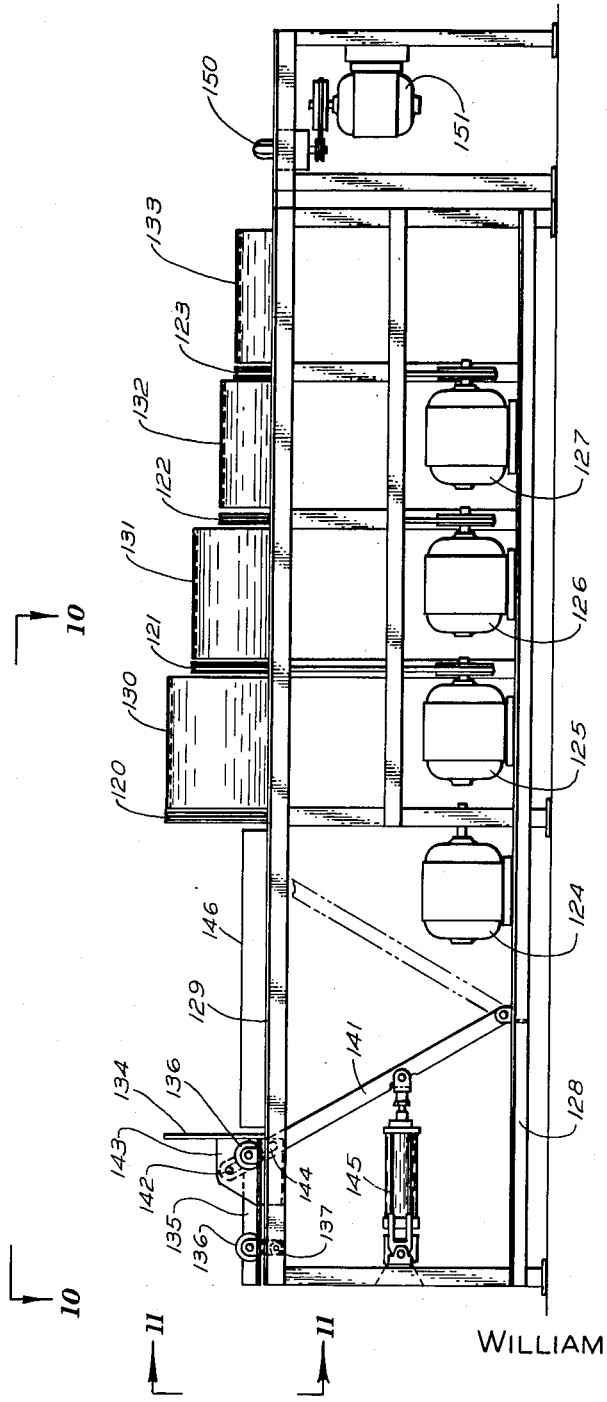
Fig. 9 shows an embodiment of this invention for making a plurality of straight cuts in a block of material.
Figure 10:
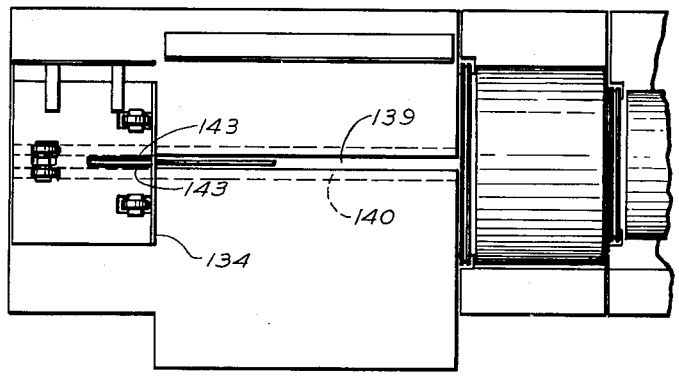
Fig. 10 is a view taken on the line 10—10 of Fig. 9.
Figure 11:
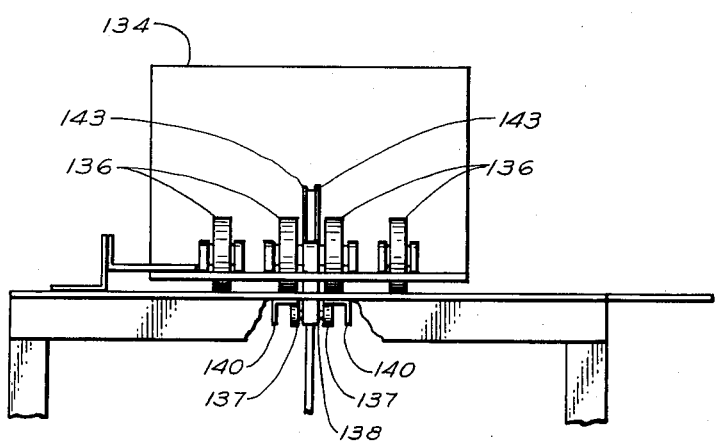
Fig. 11 is a view taken on the line 11—11 of Fig. 9.

Referring to Figs. 9, 10 and 11, there is shown an embodiment of the apparatus of this invention wherein a plurality of annular saw blades as above described are mounted coaxially but spaced apart one from the other so that a plurality of cuts in a block of material can be made in a single cutting operation to produce several different sizes of insulation or other semi-annular pieces of material. This embodiment is employed to cut the material into straight lengths and includes guides between the saw blades to ensure straightness of cuts and to prevent binding with the blades.

As shown in the drawings, annular blades 120, 121, 122 and 123 are provided and are similar in construction and mode of support as blade 16 described above. Each succeeding blade can be of a lesser diameter corresponding to the radius of the particular cut to be made and is driven by motors 124, 125, 126 and 127 just as blade 16 is driven by motor 28 in Fig. 1. Frame 128 is provided to support the motors and blades as well as table top 129. The various blades protrude through slots in the table top.

Disposed between adjacent saw blades and beyond the last saw blade in the direction of movement of the material to be sawed are guide means 130, 131, 132 and 133. The guide means comprise relatively thin semi-annular members carried by frame 128 on table top 129 and each has a mean radius substantially equal to that of the saw blade preceding it. The thickness of the guide member should be less than the width of the kerf cut by the blade just preceding the guide member. As illustrated in the drawings, the guide members can extend to a point immediately adjacent the blade preceding it and to a point adjacent the blade succeeding it, although it is to be understood that a factor as to the proximity of a guide member and a succeeding blade is the length of the guide member. Such length should be sufficient to provide adequate bearing surface for the material being sawed to guide the latter properly through the saw blades.

Means are provided moving toward and away from the cutting face of a blade which is endmost of the plurality of blades in order to push a block of material through the blades. These pushing means can comprise a plate-like member 134 carried upon a carriage 135 adapted to roll across table top 129 toward and away from blade 120. Carriage 135 has rollers 136 engaging the table top and also guide rollers 137 under the table top carried by link 138 extending through slot 139. Guide rollers 137 roll against members 140 and thereby maintain carriage 135 properly positioned on top of the table. An actuating lever 141 has one of its ends pivotally connected to frame 128 and the other connected to carriage 135 by pin 142 carried by side plates 143. Pin 142 rides in a slot 144 in lever 141 thereby providing a connection whereby lever 141 can be pushed back and forth to move carriage 135 toward and away from blade 120. Suitable means can be provided for doing this such as power cylinder 145 connected between frame 128 and lever 141.

If desired, a stop member 146 can be positioned parallel to the axes of the saw blades and to one side of the table top to facilitate positioning a block of material on the table.

When the final internal cut desired to be made in a block of material is too small for a saw blade to properly handle, a cutter head 150 can be positioned as shown in Fig. 9 to be driven by motor 151 in a manner well-known to those skilled in the art. Of course, the axis of this cutter head intersects the axes of the saw blades so that the cuts in the material will be uniformly concentric.

In operation, a block of material is placed against stop member 146 with carriage 135 withdrawn as shown in Fig. 9. Then carriage 135 can be moved forward by cylinder 145 to push the block of material through the saw blades as the latter are turned by their respective motors in the manner described above. As the material passes beyond saw blade 120, guide member 130 will be passed through the kerf and will engage the cut material along the freshly cut surfaces to guide the material inwardly thereof into blade 121. This same procedure happens each time the material passes beyond a succeeding blade. When carriage 135 is pushed to its forwardmost position adjacent blade 120, as indicated by the dashed outline of lever 141, it can be withdrawn to receive a new block of material to be cut. This new block will then be pushed into abutment with the material within the saw blades and will force the latter through the other saw blades. Obviously, several blocks of material may be abutted together at their ends in a line through the various saw blades with a succeeding block pushing a more forward block through the saws.

The terms "semi-annular" and "semi-circular" are used herein to not only apply to arcs of 180° but also arcs of a greater or lesser number of degrees.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A power saw which comprises, in combination, a frame, an annular saw blade with a circumferential groove around its outer periphery, a plurality of rollers carried by said frame and arranged to support said saw blade and prevent tilting of the rotational axis of the blade by rolling in said groove, said rollers being disposed about less than one-half of the circumference of said blade, and a belt running in said groove adapted to bear against said blade opposite said rollers to prevent said blade from disengaging its groove from said rollers, whereby said saw blade may have a short tubular length.

2. A power saw which comprises, in combination, a frame, an annular saw blade having a groove around its outer periphery, a plurality of rollers carried by said frame and arranged about an arc of less than 180°, said arc having a radius such that said rollers rotatably support said saw blade and prevent tilting of the rotational axis of the blade by bearing thereagainst within said groove, and a belt driving the saw blade, said belt received in said groove about an arc of the blade of substantially 180° opposite said arc of the blade against which the rollers bear, the thickness of the saw blade and belt when the latter is in said groove being less than the kerf cut by the blade, whereby a piece of material to be cut may be passed through the portion of the saw blade which includes the driving belt.

3. The apparatus of claim 2 wherein the width of said groove is such that the sides of said rollers have a free running fit with the sides of the groove.

4. A power saw which comprises in combination, a frame, an annular saw blade having a circumferential groove around its outer periphery, a plurality of rollers carried by said frame and arranged about an arc of less than 180°, one portion of said rollers being spaced along the outer periphery of said saw blade for bearing against both the bottom and side walls of the groove to position the saw blade and prevent tilting of the rotational axis of the blade, another portion of said rollers being spaced along said saw blade about the same arcuate portion of the blade as said one portion of rollers and bearing against the internal periphery of the blade to maintain said one portion of rollers in the groove in the blade, and a belt driving the saw blade, said belt received in said groove about an arc other than said arcuate portion about which the rollers are arranged.

5. The apparatus of claim 4 wherein the rollers extending into said groove have a free running fit with the sides of said groove.

6. The power saw which comprises in combination, a frame, an annular saw blade having a groove around its outer periphery, a plurality of rollers carried by said frame and arranged about an arc of less than 180°, said arc having a radius such that said rollers rotatably support said saw blade by bearing thereagainst within said groove, the width of said groove being such that its sides have a free running fit with the sides of the rollers, a drive belt extending around a portion of the outer periphery of said blade opposite said rollers and running in said groove, power means for driving said belt, and a means for guiding and passing a block of material to be sawed completely through the periphery of said saw blade opposite said rollers and about an axis lateral to said blade comprising a pair of dogs adapted to grasp said block, said dogs being mounted for rotation movement about said axis.

7. A power saw which comprises in combination, an annular saw blade having a groove around its outer periphery, a plurality of rollers carried by said frame and arranged to extend into said groove and to have a free running fit with the sides thereof to thereby rotatably support said saw blade, said rollers being arranged about less than one-half of the periphery of said blade, a drive belt extending around a portion of the outer periphery of said blade opposite said rollers and running in said groove, power means for driving said belt, a means for guiding and passing a block of material completely through said portion of said saw blade opposite said rollers comprising a pair of dogs adapted to grasp said block on adjacent sides thereof, said dogs being mounted to turn about an axis laterally removed from but in a plane through the cutting edge of said blade.

8. A power saw which comprises, in combination, a frame, a plurality of annular saw blades each having a groove around its outer periphery and each being coaxially spaced apart from the others, a set of rollers carried by said frame for each saw blade and arranged about an arc of less than 180°, said arc having a radius such that said rollers rotatably support their respective saw blades by bearing thereagainst within said groove, a belt for each saw blade running in said grooves and bearing against a portion of the outer periphery of its respective blade opposite said rollers thereof, power means for driving said blade and guide means between adjacent blades comprising semi-annular members carried by said frame coaxially with said saw blades, said members having a mean radius and thickness such that a block of material cut by an adjacent blade can be slid along said guide member with the latter within the cut.

9. The apparatus of claim 8 wherein said blades are of different radii and are arranged in progressively changing radii in the direction of travel of the block of material to be sawed and wherein each of said guide means has a mean radius corresponding to that of the saw blade just preceding it.

10. The apparatus of claim 9 wherein each of said guide means extend from a point immediately adjacent the blade just preceding it to a point adjacent the blade just succeeding it.

11. As a subcombination, a frame, an annular saw blade having a groove around its outer periphery, a set of rollers carried by the frame and arranged about an arc of less than 180°, said arc having a radius such that said rollers rotatably support said saw blade by bearing thereagainst within said groove, a belt running in said groove and bearing against a portion of the outer periphery of said blade opposite said rollers, power means for rotating said blade and a semi-annular guide member adjacent said blade and arranged coaxially therewith, the mean radius and thickness of the guide member being such as to pass through a cut in a block of material sawed by said blade.

12. The power saw of claim 6 wherein said axis lies in the plane of rotation of said saw blade and wherein means is provided for varying the distance between said axis and the axis of rotation of said blade to change the radius of curvature of the cut made.

13. In a power saw having an annular saw blade mounted for rotation with the portion of the saw on one side of a diametral plane therethrough serving as the cutting portion of the saw, a feeding and guiding apparatus for passing a block of material through said portion of the saw comprising, a shaft extending in the plane of rotation of the saw blade and normal to said diametral plane, arms extending radially from and mounted for rotation about said shaft, said arms angularly disposed relative to each other, and spaced apart dogs carried by said arms and adapted to receive a workpiece therebetween and guide it through the saw upon rotation of the arms about said shaft, said dogs being curved with their inner faces struck on radii slightly greater than the radius of the saw blade and carried by said arms in positions to overlie but clear the saw blade upon rotation of the arms about the shaft.

14. In a power saw having an annular saw blade mounted for rotation with the portion of the saw on one side of a diametral plane therethrough serving as the cutting portion of the saw, a feeding and guiding apparatus for passing a block of material through said portion of the saw comprising, a shaft extending in the plane of rotation of the saw blade and normal to said diametral plane, arms extending radially from and mounted for rotation about said shaft, said arms angularly disposed relative to each other, and spaced apart dogs carried by said arms and adapted to receive a workpiece therebetween and guide it through the saw upon rotation of the arms about said shaft, said dogs being curved with their inner faces struck on radii slightly greater than the radius of the saw blade and carried by said arms in positions to overlie but clear the saw blade upon rotation of the arms about the shaft, one of said dogs being movable toward and away from the other of said dogs to grasp and release a workpiece.

15. In a power saw having an annular saw blade mounted for rotation with the portion of the saw on one side of a diametral plane therethrough serving as the cutting portion of the saw, a feeding and guiding apparatus for passing a block of material through said portion of the saw comprising, a shaft extending in the plane of rotation of the saw blade and normal to said diametral plane, a carrier mounted for rotation about said shaft, and a pair of spaced apart dogs on said carrier angularly disposed relative to each other and adapted to receive a workpiece therebetween and guide it through the saw upon rotation of the carrier about said shaft, said dogs being curved with their inner faces struck on radii slightly greater than the radius of the saw blade and carried by said carrier in positions to overlie but clear the saw blade upon rotation of the carrier about the shaft.

16. The saw of claim 13 wherein said shaft is movable toward and away from the saw blade and the dogs are movable along said arms to vary the radius of curvature of the curved surface formed in the block of material and still to allow the dogs to pass over the saw.

References Cited in the file of this patent

UNITED STATES PATENTS

| | | |
|---|---|---|
| 22,792 | Field | Feb. 1, 1859 |
| 25,014 | Hay | Aug. 9, 1859 |
| 31,449 | Field | Feb. 19, 1861 |
| 81,434 | Thompson | Aug. 25, 1868 |
| 102,920 | Dana | May 10, 1870 |
| 128,243 | Osten | June 25, 1872 |
| 190,452 | Stevens | May 8, 1877 |
| 300,784 | Lucas | June 24, 1884 |
| 384,361 | Hamlin | June 12, 1888 |
| 397,727 | King | Feb. 12, 1889 |
| 516,208 | Lane | Mar. 13, 1894 |
| 565,633 | Pessenger | Aug. 11, 1896 |
| 581,183 | Tope et al. | Apr. 20, 1897 |
| 666,631 | Walters | Jan. 22, 1901 |
| 725,908 | Wineman | Apr. 21, 1903 |
| 888,990 | Fuller | May 26, 1908 |
| 1,473,961 | McPhee | Nov. 13, 1923 |
| 1,536,691 | Russ | May 5, 1925 |
| 1,607,784 | Spangler | Nov. 23, 1926 |
| 2,062,257 | Douglas et al. | Nov. 24, 1936 |
| 2,192,552 | Kinney | Mar. 5, 1940 |
| 2,619,138 | Marler | Nov. 25, 1952 |

FOREIGN PATENTS

| | | |
|---|---|---|
| 11,435 | Great Britain | Nov. 1846 |
| 28,753 | Sweden | Apr. 23, 1910 |
| 715,350 | France | Sept. 28, 1931 |